(12) United States Patent
Di Liberto et al.

(10) Patent No.: US 12,018,778 B2
(45) Date of Patent: Jun. 25, 2024

(54) INTEGRATED JOINING SYSTEM IN TUBULAR FLUID DISTRIBUTION ELEMENTS

(71) Applicant: Pipes & Fittings Eqofluids S.L., Valencia (ES)

(72) Inventors: Luca Di Liberto, Genoa (IT); Giacomo Granata, Gandia (ES); Miguel Cerda, Gandia (ES)

(73) Assignee: PIPES & FITTINGS EQOFLUIDS S.L., Valencia (ES)

( * ) Notice: Subject to any disclaimer, the term of this patent is extended or adjusted under 35 U.S.C. 154(b) by 36 days.

(21) Appl. No.: 17/922,936

(22) PCT Filed: Apr. 30, 2021

(86) PCT No.: PCT/EP2021/025166
§ 371 (c)(1),
(2) Date: Nov. 2, 2022

(87) PCT Pub. No.: WO2021/223913
PCT Pub. Date: Nov. 11, 2021

(65) Prior Publication Data
US 2023/0160504 A1 May 25, 2023

(30) Foreign Application Priority Data
May 5, 2020 (IT) .................. 102020000009817

(51) Int. Cl.
*F16L 21/08* (2006.01)
*F16L 3/10* (2006.01)
(Continued)

(52) U.S. Cl.
CPC ............. *F16L 21/08* (2013.01); *F16L 3/1075* (2013.01); *F16L 3/1091* (2013.01); *F16L 21/03* (2013.01); *F16L 21/065* (2013.01); *F16L 23/08* (2013.01)

(58) Field of Classification Search
CPC ....... F16L 21/08; F16L 3/1075; F16L 3/1091; F16L 21/03; F16L 21/065; F16L 23/08
See application file for complete search history.

(56) References Cited

U.S. PATENT DOCUMENTS 3,485,515 A * 12/1969 Frishof .................. F16L 21/08
285/5
3,964,773 A * 6/1976 Stade ..................... F16L 23/08
285/411
(Continued)

FOREIGN PATENT DOCUMENTS

DE 29519221 U1 1/1996
EP 1273842 A2 1/2003
(Continued)

*Primary Examiner* — David Bochna
(74) *Attorney, Agent, or Firm* — Richard M. Goldberg (57) ABSTRACT

Integrated joining system in tubular fluid distribution elements includes a tubular element having a first enlarged cup-shaped end and a second opposite end with a radial protuberance, the first end equipped with a flange having an external concentric edge and an inside cavity capable of receiving and retaining an elastomeric gasket, the first end having a concentric radial groove adjacent to the edge, and having an end edge protruding from the tubular element, the assembly of the tubular elements occurs by inserting the second end of a tubular element inside the cup-shaped end of a similar tubular element up to a shoulder of the cup-shaped end with the edge of the second end having passed the gasket, a junction block including two semicircles placed (Continued)

around the tubular element at this concentric edge and end edge which, by tightening by clamping elements, crimps the two tubular elements.

13 Claims, 11 Drawing Sheets

(51) Int. Cl.
    *F16L 21/03*     (2006.01)
    *F16L 21/06*     (2006.01)
    *F16L 23/08*     (2006.01)

(56) References Cited

U.S. PATENT DOCUMENTS

| | | | |
|---|---|---|---|
| 4,070,046 A * | 1/1978 | Felker | F16L 21/08 285/348 |
| 4,569,542 A * | 2/1986 | Anderson | F16L 21/08 285/348 |
| 10,975,992 B1 * | 4/2021 | Totushek | F16L 21/065 |
| 2008/0054636 A1 * | 3/2008 | Reid | F16L 21/08 285/411 |
| 2010/0308183 A1 | 12/2010 | Hennon | |
| 2011/0220238 A1 * | 9/2011 | Schnallinger | F16L 21/03 285/308 |
| 2012/0299293 A1 * | 11/2012 | Chiproot | F16L 21/03 285/337 |
| 2019/0162341 A1 * | 5/2019 | Chiproot | F16L 21/065 |
| 2020/0263815 A1 * | 8/2020 | Borges | F16L 21/08 |

FOREIGN PATENT DOCUMENTS

| | | | | |
|---|---|---|---|---|
| JP | 2017082891 A | * | 5/2017 | F16L 21/08 |
| KR | 100833815 B1 | | 6/2008 | |
| WO | 03/085310 A1 | | 10/2003 | |

* cited by examiner

INTEGRATED JOINING SYSTEM IN TUBULAR FLUID DISTRIBUTION ELEMENTS

BACKGROUND OF THE INVENTION

This invention relates to a joining system for tubular fluid distribution elements. In particular, this invention deals with an integrated joining system in tubular elements capable of withstanding high fluid pressures.

Various types of joint systems for tubular elements for fluid distribution are known.

A first type consists of a system in which the joint between the circular section pipes takes place without the use of radial welding and without threading in which said joint occurs through a watertight cup that uses an elastomeric sealing gasket. Each single tubular element has, at one end, a socket fitting (female) and, at the opposite end, a fitting with dimensions equal to the nominal external diameter of the tubular element (male) with a tolerance such as to allow coupling between the same.

The hydraulic seal to the internal pressure (and to the vacuum) is ensured by means of a toroidal gasket (or other suitable shape) in elastomeric material.

The pipes can, therefore, be introduced one inside the other in order to create continuous piping.

This type of joint has the main drawback of absolutely not being able to guarantee the resistance to extraction between the pipes in the case of introduction of pressures of a certain force. In order to guarantee the resistance to extraction, suitable ancillary works such as concrete blocks, mechanical anchors, etc. are necessary.

These pipes are mainly used with relatively low atmospheric pressure values for the construction of aqueducts, irrigation systems, waste water, smoke evacuation, vacuum and sewerage.

The materials used are many including metal, thermoplastic, ceramic and fibre cement.

They also have several drawbacks including the impossibility of a stable connection between the pipes when the fluid is under pressure, except through special processing and/or ancillary works.

Another known system consists of pipes with a continuous circular section and joint fittings, both made of the same metal material, in which the hydraulic seal to internal pressure (and vacuum) is ensured by a toroidal gasket (or other suitable shape) in elastomeric material.

The pipes can be easily inserted inside the socket of the jointing sleeve (or fitting of another shape: for example, elbow, reduction) and the anti-slip retention of the tubular element is achieved by pressing radial sectors by means of tools dedicated (mainly hydraulic clamps).

The pressure applied internally to the pipes cannot, therefore, cause the detachment (extraction) of one tubular element from the other due to the locking system consisting precisely of the deformed sections of the tubular element and fitting.

The materials used are mainly stainless steel and copper.

This system also has several drawbacks including the need to use two gaskets for as many assembly operations on a single joint, the need for specific equipment to perform the pressing, the impossibility of disassembly and reassembly in the event of errors or modifications and, finally, the possible error of "pressing" or positioning of the pipe by the operator, with the consequent risk of hydraulic system leaks and/or the need for a new execution of the joint with a significant increase in costs.

Also known are joining systems by means of shell fittings, provided with radial recesses made in positive with respect to the external surface of the pipe, having the function of retaining the pipes and containing/compressing an elastomeric sleeve gasket. Each single tubular element has, near each end, a radial recess mainly with a rectangular or half-round section. This withdrawal is performed by mechanical processing or by plastic deformation (e.g., rolling). The two half shells are joined together by means of bolts, at the close ends of the two pipes and therefore perform a retaining function between the same pipes by means of the radial section protrusions able to fit into the corresponding recess of the tubular element and function hydraulic seal through containment/compression of the gasket between them contained in a seat of suitable geometry.

The pressure applied internally to the pipes cannot, therefore, cause the detachment (extraction) of the pipes due to the locking system constituted precisely by the recesses (grooves) of the tubular element that accommodate a radial tooth of similar section (without interference).

The complementary fittings use the same joining system, but the recesses (grooves) can also be obtained by forming in moulds (die casting, casting, forging, etc.). The materials mainly used are: steel, cast iron, stainless steel, and aluminium alloys.

Said system, although it allows a certain speed of installation except for the need to join together pieces of tubular element of non-standard lengths and the possibility of disassembly and reassembly, has several drawbacks including the high cost of the elastomeric gasket and the need for caulking of the tubular element at both ends. In addition to this, the elastomeric gasket, of large volume, is subjected to mechanical compression which is often not uniform, with a possible defect in the hydraulic seal (especially after installation, due to the possible elastic decay of the elastomer of which the gasket is made up).

The installation also requires a perfect alignment of the pipes due to the small depth of keying, which generates possible hydraulic sealing problems.

Furthermore, there is a need for ancillary processing of one or more pipes (rolling, pressing, turning) if a different length of the tubular element is required than the standard supply. This operation of cutting to size a tubular element involves the loss of one of the two radial grooves, which must be recreated: therefore, the availability of suitable equipment on site is necessary. The grooves made by rolling cause, however, a localised narrowing (constriction) of the passage section which is repeated twice for each single pipe. Said variations in the passage section also determine turbulence and head losses as a function of the flow velocity value and the thickness of the pipes must be oversized in the event that the recessed groove is performed by removing material (e.g., turning). With this system, the maximum internal pressure values cannot normally exceed 8-10 bar. This is based on the safety coefficients established by international standards which may require minimum yielding pressures up to five times said operating pressures.

Another known joint system uses a radial band joint of shaped sheet metal that allows the retention of the tubular element by compression of a notched radial ring in sectors and the hydraulic seal by compression of a sleeve gasket. The band joint embraces the end sections of the two opposing pipes and is "reduced" in diameter by screwing two or more bolts in correspondence with a longitudinal opening of the band itself: the reduction in diameter causes the teeth to penetrate into the thickness of the tubes and the consequent contrast to the axial extraction and the tightening of the bolts allows the compression of the elastomeric gasket along the surfaces of the two pipes and the consequent hydraulic seal. The material mainly used for the construction of the basic elements is stainless steel.

The disadvantages of this system are the need for a perfect alignment of the piping due to the small depth of keying with consequent possible problems of hydraulic seal, the difficulty of insertion on the tubular element due to possible expansion limit of the band in some variables of the diameters of usable coupling. Furthermore, the tubular element requires caulking of the opposite end to the socket, the use of a torque wrench is mandatory for tightening the bolts and the elastomeric gasket of large volume is subject to mechanical compression which is often not uniform, with possible defect of hydraulic seal (especially after installation, due to the possible elastic decay of the elastomer of which the gasket is made). Even in this case, maximum internal operating pressure values higher than 8-10 bar are often not achievable. This is a function of safety factors established by international standards that may require minimum yielding pressures up to five times the operating pressures.

A last known joining system provides for the use of couplings with sleeve couplings with hydraulic seal by means of an elastomeric gasket and retention of the tubular element by means of compression half-rings acting on rings with a frusto-conical section with radial toothing and equipped with of tangential gap. The fitting is inserted axially on the pipes (and/or the pipes in the fitting) for the entire keying depth, passing the gasket (usually with toroidal section), placed in a seat of the body, up to the stop. By acting on the half-ring bolts, the diameter of the truncated cone ring is reduced, causing the radial toothing to penetrate into the thickness of the pipe. The truncated cone section improves the penetration of the teeth when the axial stress generated by the internal pressure undergoes its relative increase. The construction materials are mainly aluminium alloys, different metals and thermoplastics.

This joint system also has several drawbacks including the use of two gaskets for as many assembly operations on a single joint: the cost of the joint is quite high.

SUMMARY OF THE INVENTION

The present invention overcomes the aforementioned drawbacks by providing a stable and safe joint system for pipes that can be made in reduced installation times, using assembly equipment and accessories that are not complex, not bulky and normally supplied (Allen wrenches, fixed wrenches, battery screwdrivers of normal power).

The system also offers resistance to internal pressure of fluids up to, for example, 16 bar in operation with a safety factor of up to 4.5 times said value, in which the minimum yielding pressure substantially corresponds to 72 bar.

Furthermore, it is always possible to assemble, disassemble and reassemble the pipes and use pieces of pipe of non-standard length without the need to recreate the flanges/recesses/grooves necessary for retention. Lastly, the system uses a single gasket, of relatively low cost, for each joint.

The present invention relates to an integrated joining system for tubular fluid distribution elements according to the characteristics of the attached claims.

BRIEF DESCRIPTION OF THE DRAWINGS

The invention will be described in detail in one of its embodiments, exemplary but not limiting made with reference to the attached Figures in which:

FIG. 6 illustrates a top view of two tubular elements joined by the band fitting according to the prior art,
FIG. 7 illustrates a side view of what is shown in FIG. 6,
FIG. 8 illustrates a longitudinal section according to A-A of FIG. 7,
FIG. 9 illustrates the enlarged detail D of FIG. 8,
FIGS. 10a, 10b and 10c illustrate the assembly steps of two tubular elements joined together by means of the joining system according to the present invention.

DETAILED DESCRIPTION

Figures 1, 2, 3:
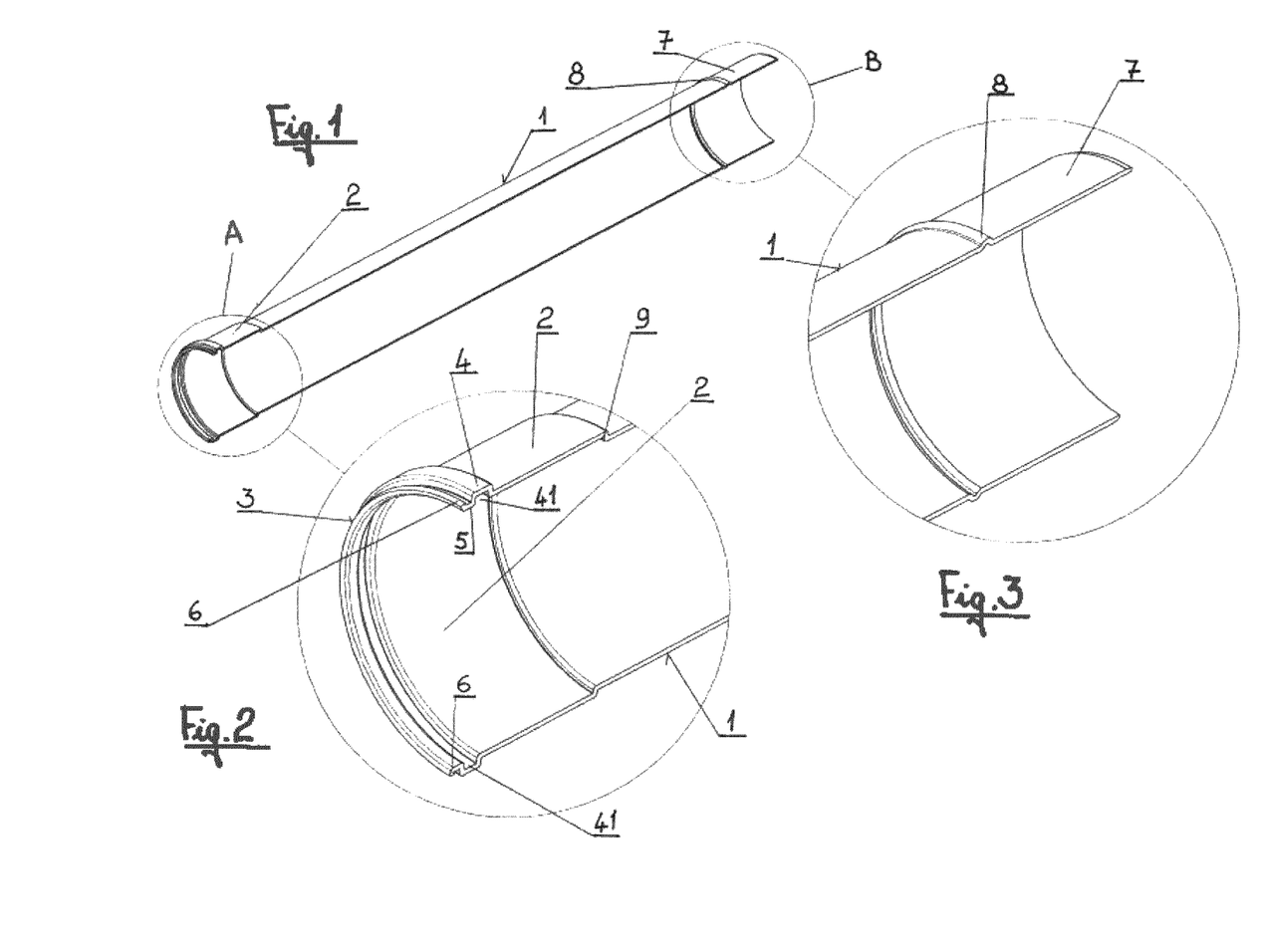
FIG. 1 illustrates a perspective longitudinal section of a tubular element according to this invention.
FIG. 2 illustrates an enlarged view of detail A of FIG. 1.
FIG. 3 illustrates an enlarged view of detail B of FIG. 1.

With reference to the aforementioned Figures, the tubular element 1 according to the present invention has, at a first end 2, with an enlarged cup-shape (female) equipped with a specially shaped flange 3 so as to create a concentric edge 4 external to the tubular element and respective cavity 41 turned towards the inside of said tubular element 1, suitable for receiving and retaining inside it an elastomeric gasket 11 with a circular seal or of other convenient shape. Said tubular element 1, in said end 2, comprises a radial groove 5 which is also concentric, flanked and external to said edge 4, provided with an end edge 6, protruding with respect to the external surface of the tubular element 1. The aforementioned edge 4 and the aforementioned radial groove 5 therefore form an "S"-shaped flange. A second end 7 (male) of the tubular element 1 is, on the other hand, of the same diameter as the tubular element and is equipped with a preferably continuous radial protuberance with a hump 8.

Figures 4, 5:
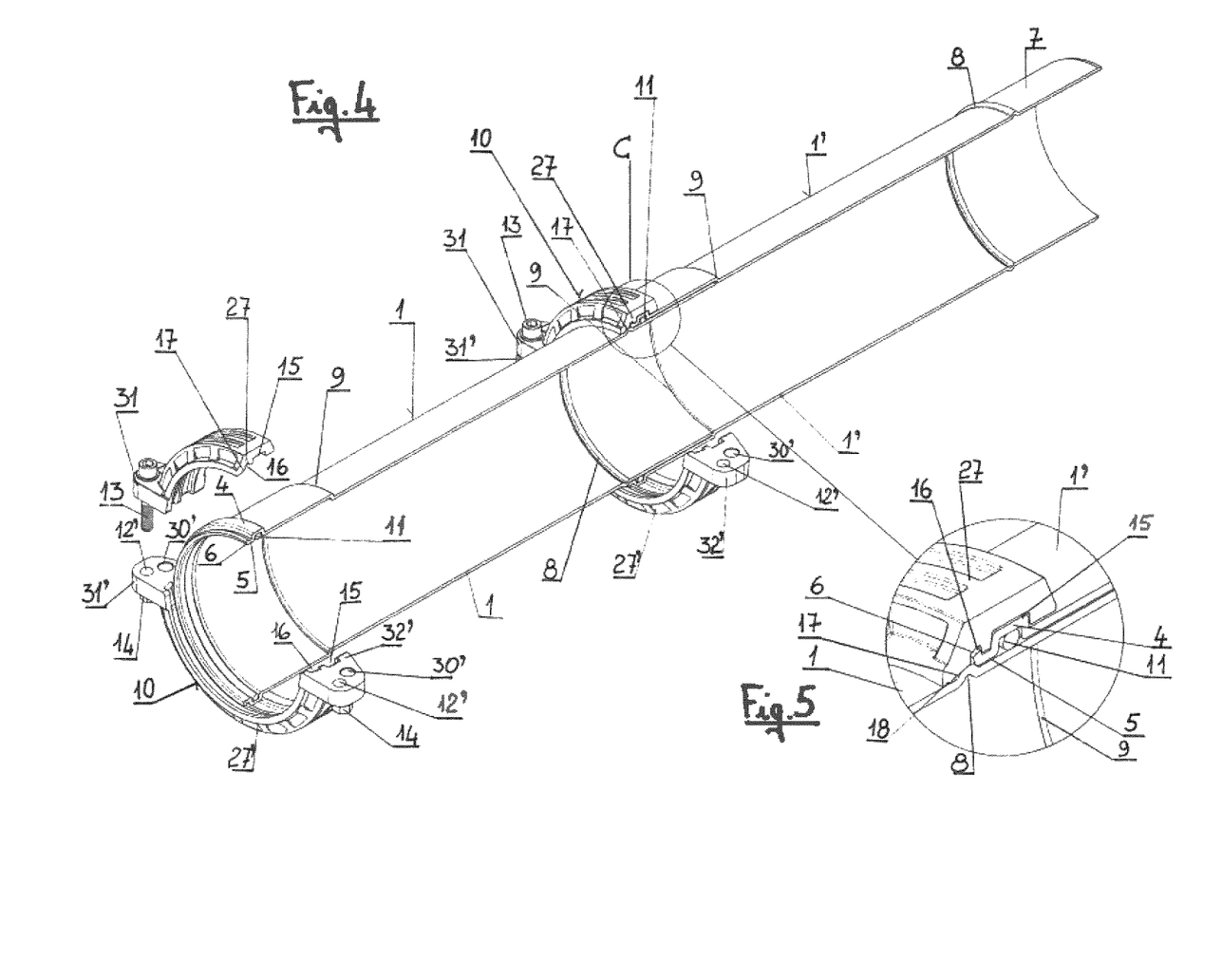
FIG. 4 illustrates a perspective longitudinal section of two tubular elements joined by the system according to a first embodiment of this invention.
FIG. 5 illustrates the enlarged detail C of FIG. 4.
Figures 6, 7, 8, 9:
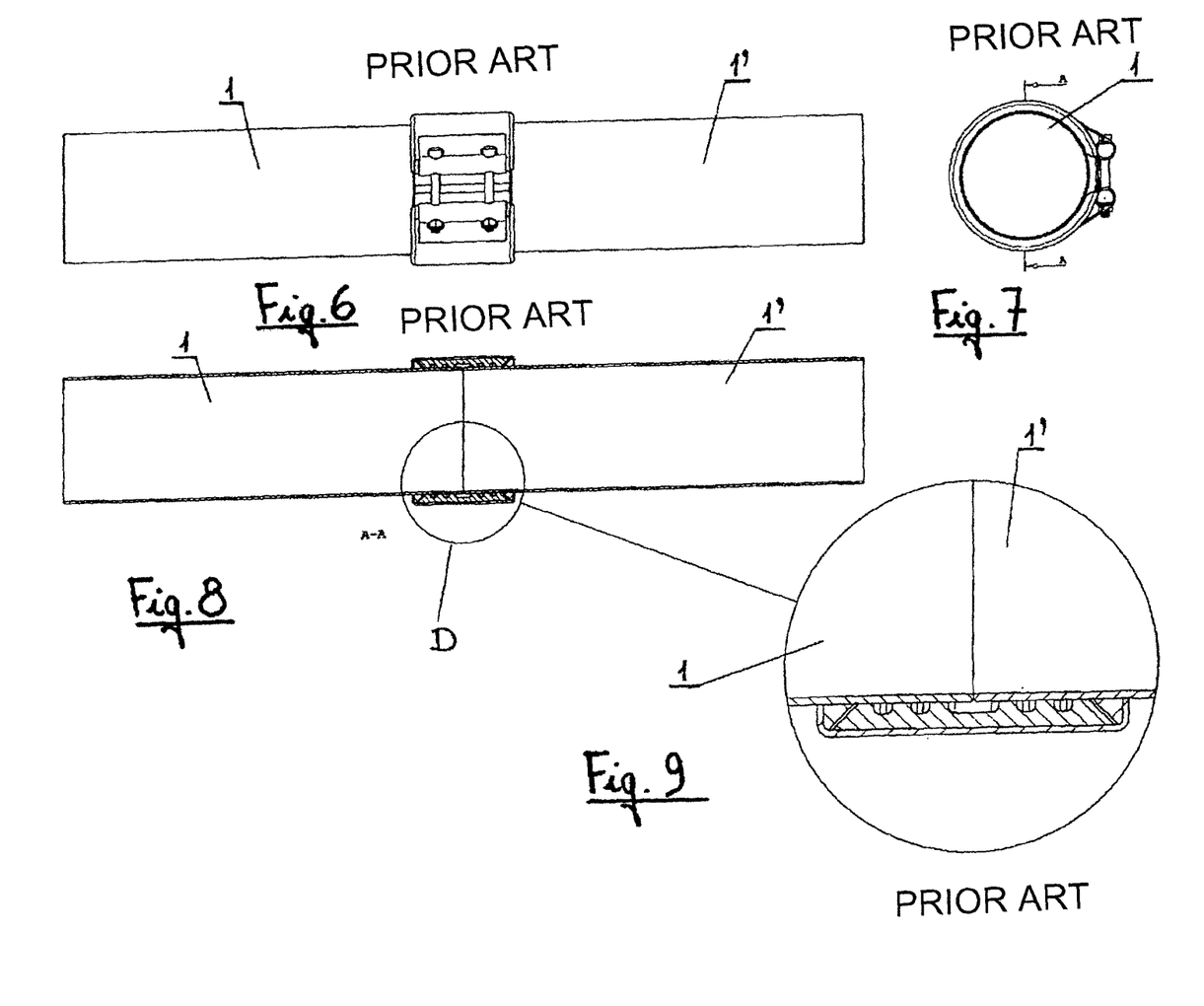
Figures 10A, 10B, 10C:
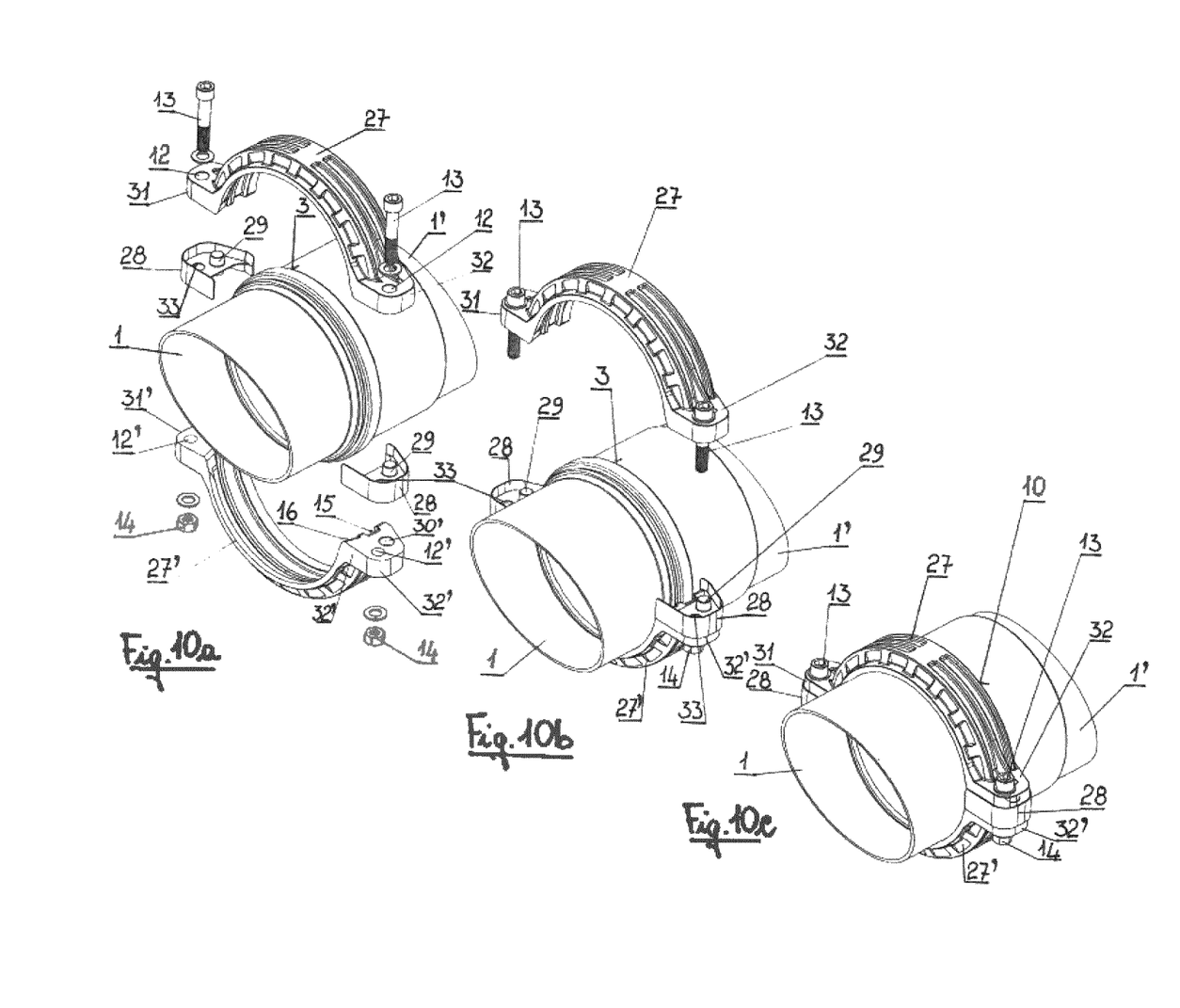

The tubes are then assembled by inserting the second male end 7 of a tubular element 1 inside the first cup end 2 of another tubular element 1' up to the end of its axial stroke and, therefore, up to contact of a base or shoulder 9 of the cup-shaped end 2 with the edge of the second end 7, after this edge has passed the elastomeric seal 11 received in the cavity 41. In this position, said protuberance 8 of the tubular element 1 finds a nest in the end edge 6 of the tubular element 1'.

To ensure axial retention between the tubular elements 1 and 1', a junction block 10 is provided consisting of two semicircles 27, 27' which are placed radially around the tubular element 1, 1' at said concentric edge 4 and at said end edge 6 thus clamping the two tubular elements 1, 1'.

Said junction block comprises, at its ends, a pair of symmetrical protuberances 31, 31', 32, 32' with through holes 12, 12' capable of accommodating tightening elements such as screws 13 which are locked with relative nuts 14. The two semicircles 27, 27', on the inside, have radial cavities 15, 16 specially shaped so as to accommodate inside them the external edge 4 of the flange 3 in the cavity 15 and the end edge 6 of the said flange 3 in the cavity 16. The edge of the junction block 10 next to the cavity 16 (FIG. 5) has an inclined wall 17 which rests on and covers the protuberance 8 of the tubular element 1 and is equipped with a tooth 18 which, in turn, rests on the outer edge of the tubular element 1.

The two semicircles 27, 27' therefore geometrically copy the profile of the flange 3 of the tubular element 1', the protuberance 8 and the adjacent part of the tubular element 1, thus creating a solid seaming bond when the tightening screws 13 of the junction block 10 are are screwed in.

In order to facilitate the alignment of the two locking semicircles 27, 27', the use of a spacer 28 is provided (optional), specially shaped so as to partially accommodate the protuberances 31, 31', 32, 32' which must be joined together, thus acting as a fixing guide. Said spacer 28 is equipped with a bushing 29, able to fit into special holes 30, 30' made in the protuberances 31, 31', 32, 32' as well as a through hole 33 to accommodate the tightening bolts 13.

Figures 11, 12:
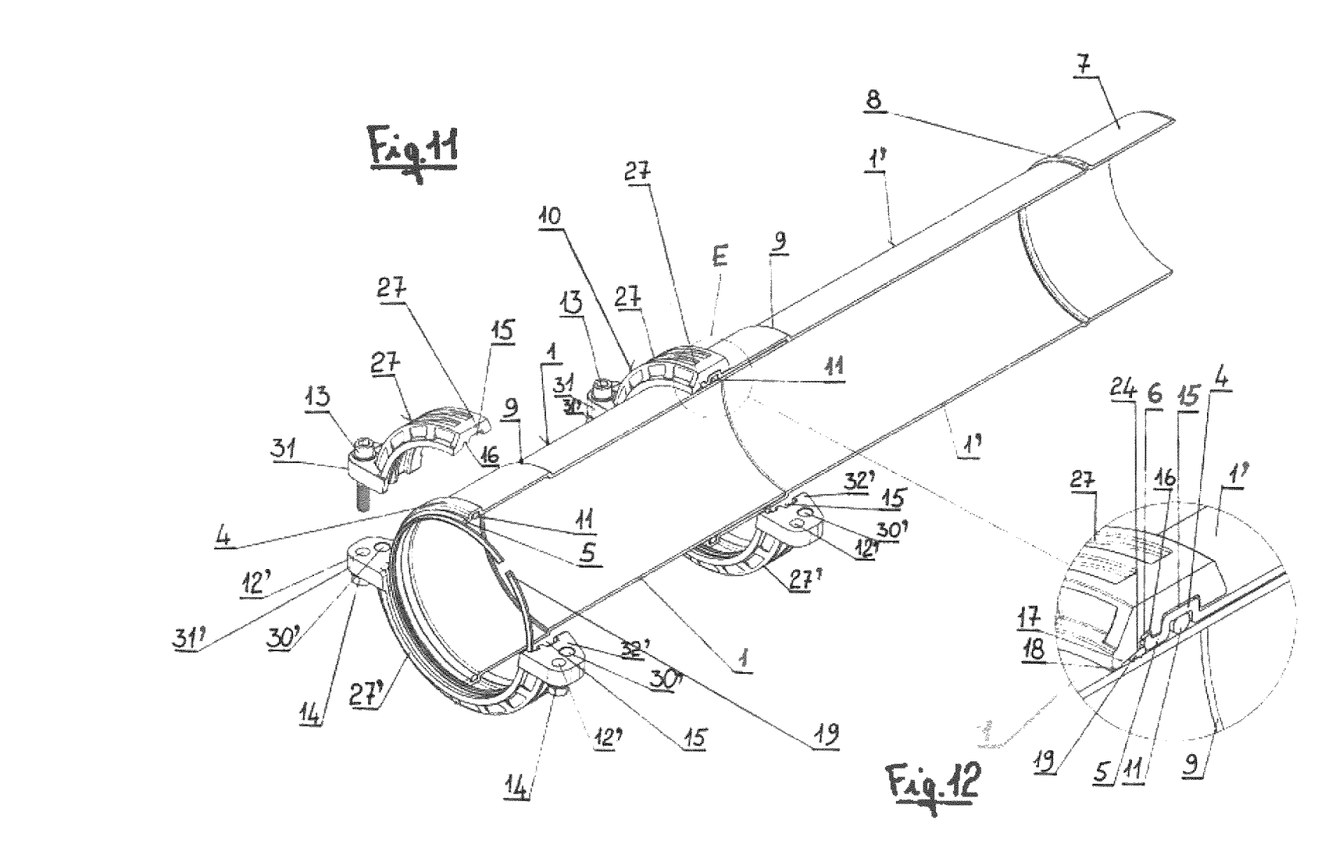
FIG. 11 illustrates a perspective longitudinal section of two tubular elements joined together by means of the joining system according to a second embodiment of this invention.
FIG. 12 illustrates the enlarged detail E of FIG. 11.

In case, then, it is necessary to have a shorter tubular element due to the conformation of the network of pipes, it is possible to cut the male end 7 of the tubular element 1 that is the one with the radial protuberance 8. In this case, if the cut comprising said protuberance 8, in a second embodiment of the invention (FIG. 11), the retention of the cut tubular element takes place by means of the use of a truncated cone-shaped crimping ring 19 equipped, in the internal part, with tooth 20, capable of gripping the tubular element when the screws 13 of the junction block 10 are tightened. Said ring 19 is also equipped with a notch 21 whose size is determined on the basis of the effective need for tightening the tubular element, according to its circumference and its thickness. It is inserted into the tubular element 1 and made to slide along it until it touches the upper part of the flange 3 of the tubular element 1'; in this position, the internal part of the junction block 10, in correspondence with the inclined wall 17, meets the external part of the ring 19 and, when the screws 13 are tightened, the inclined wall 17 presses on the inclined edge 24 of the ring 19, resulting in the crimping described above.

The particular geometry of the tooth 20 is such as to ensure the retention of the tubular element as it penetrates to an extent that varies from 0.5 to 1 or more millimetres in the tubular element 1, in relation to its thickness. The penetration must, however, be limited in order not to cause an excessive notch in the wall of the tubular element.

Figure 22:
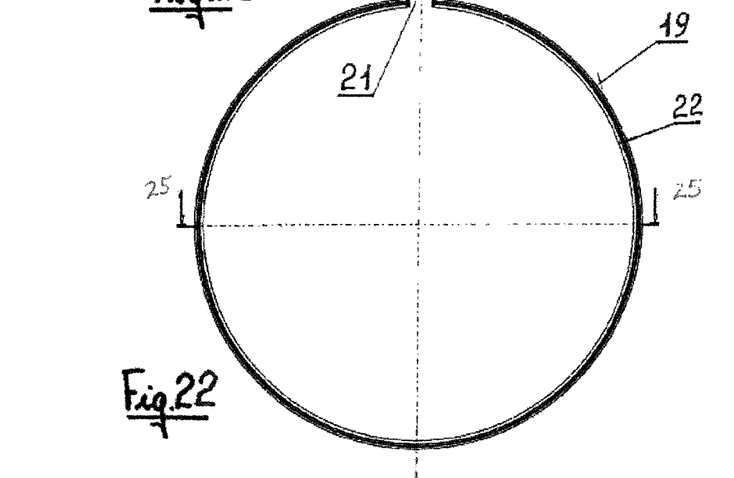
FIG. 22 illustrates the top view of a tightening ring according to a second embodiment of the ring of the present invention.
Figure 23:
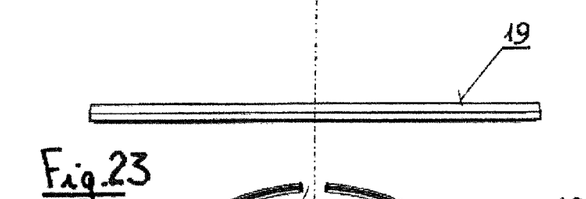
FIG. 23 illustrates the side view of the tightening ring of FIG. 22.
Figure 24:
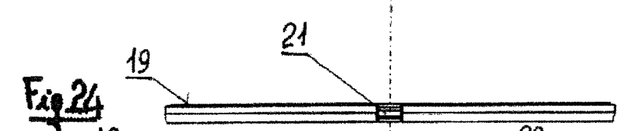
FIG. 24 illustrates a further side view of the tightening ring of FIG. 22.
Figure 25:
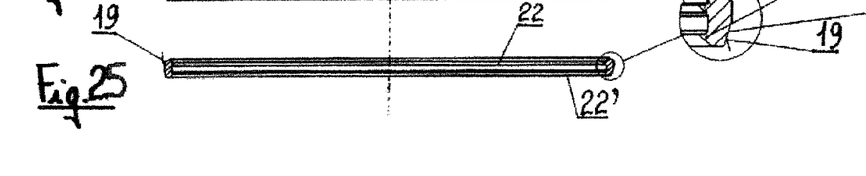
FIG. 25 illustrates the cross section according to 25-25 of FIG. 22.
Figure 26:
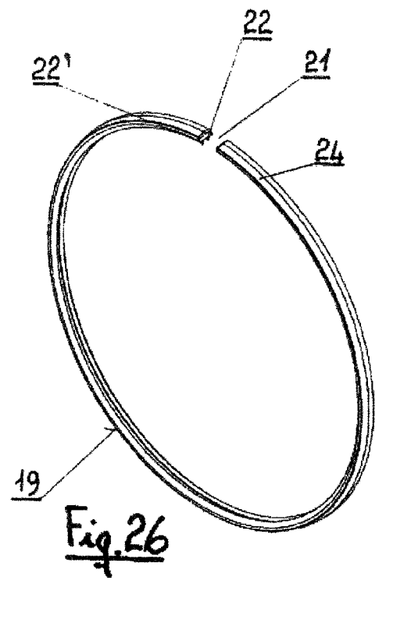
FIG. 26 illustrates a perspective view of the tightening ring of FIG. 22.
Figures 27, 28:
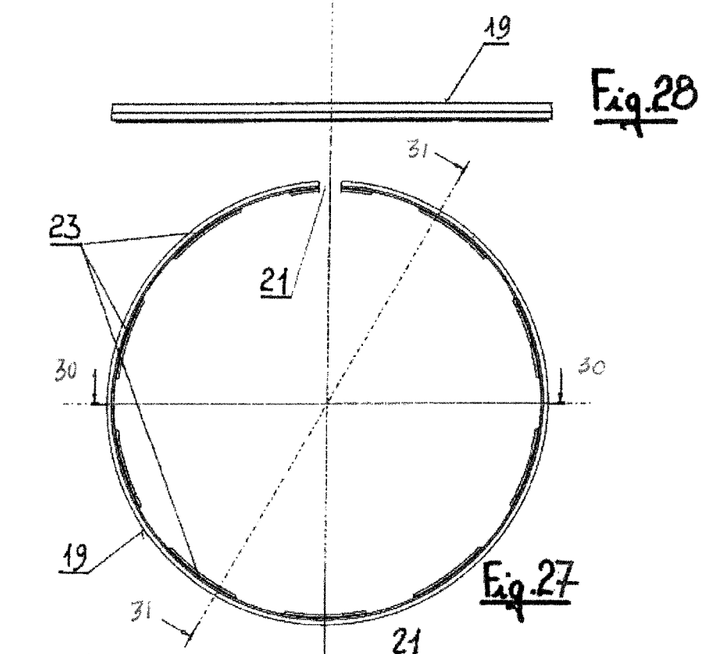
FIG. 27 illustrates the top view of a tightening ring according to a third embodiment of the ring of the present invention.
FIG. 28 illustrates the side view of the tightening ring of FIG. 27.
Figures 29, 30, 31:
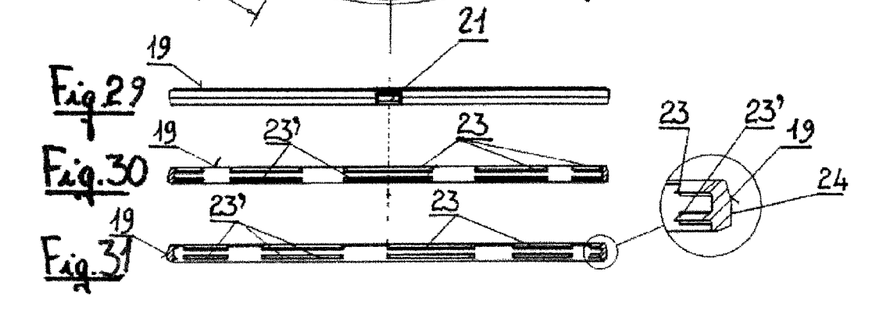
FIG. 29 illustrates a further side view of the tightening ring of FIG. 27.
FIG. 30 illustrates the cross section according to 30-30 of FIG. 27.
FIG. 31 illustrates the cross section according to 31-31 of FIG. 27.
Figure 32:
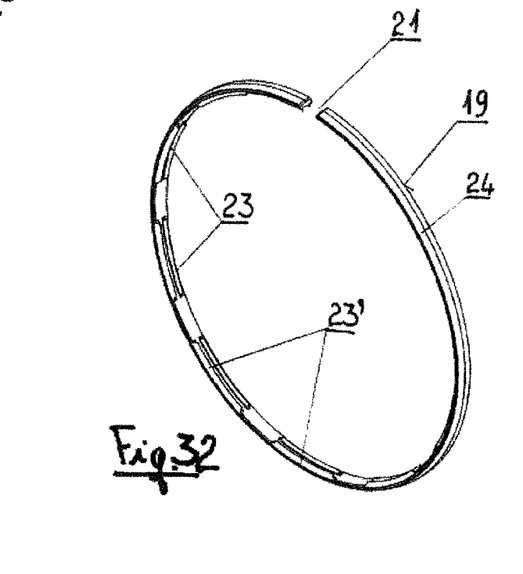
FIG. 32 illustrates a perspective view of the tightening ring of FIG. 27.
Figure 33:
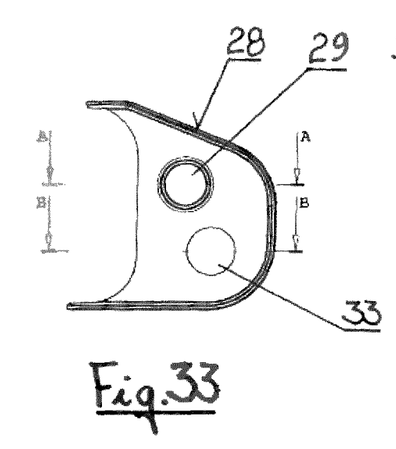
FIG. 33 illustrates a top view of the spacer according to the present invention.
Figure 34:
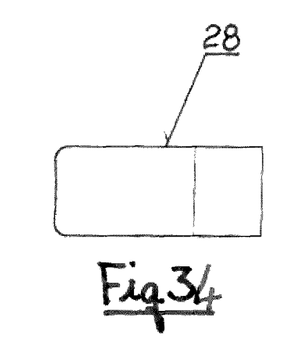
FIG. 34 illustrates a side view of the spacer of FIG. 33.
Figures 35, 38:
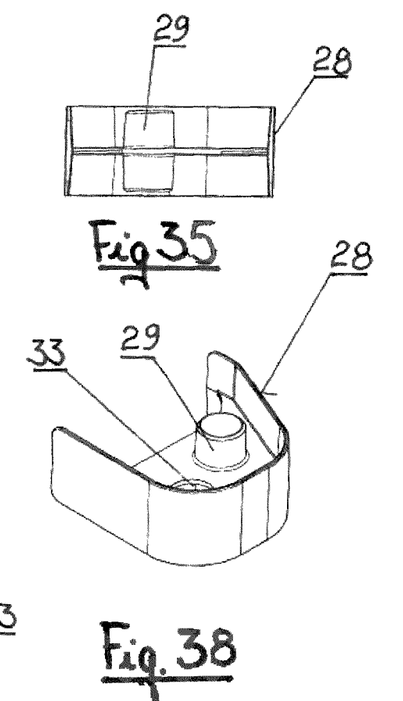
FIG. 35 illustrates a front view of the spacer of FIG. 33.
FIG. 38 illustrates a perspective view of the spacer of FIG. 33.
Figure 36:
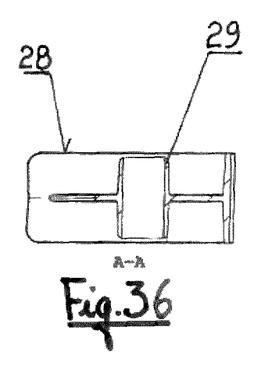
FIG. 36 illustrates a section of the spacer according to 36-36 of FIG. 33.
Figure 37:
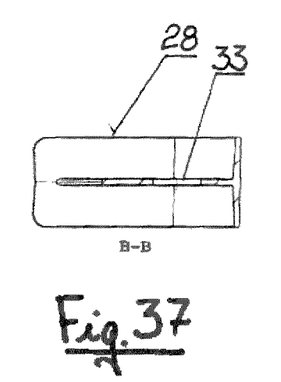
FIG. 37 illustrates a section of the spacer according to 37-37 of FIG. 33.

In further embodiments, preferably the crimping ring 19 is provided, in the internal part, with two or more teeth 22, 22' or by a series of two or more teeth 23, 23' parallel to each other and interspersed with free spaces so as to guarantee an even greater pressure seal.

Figures 13, 14:
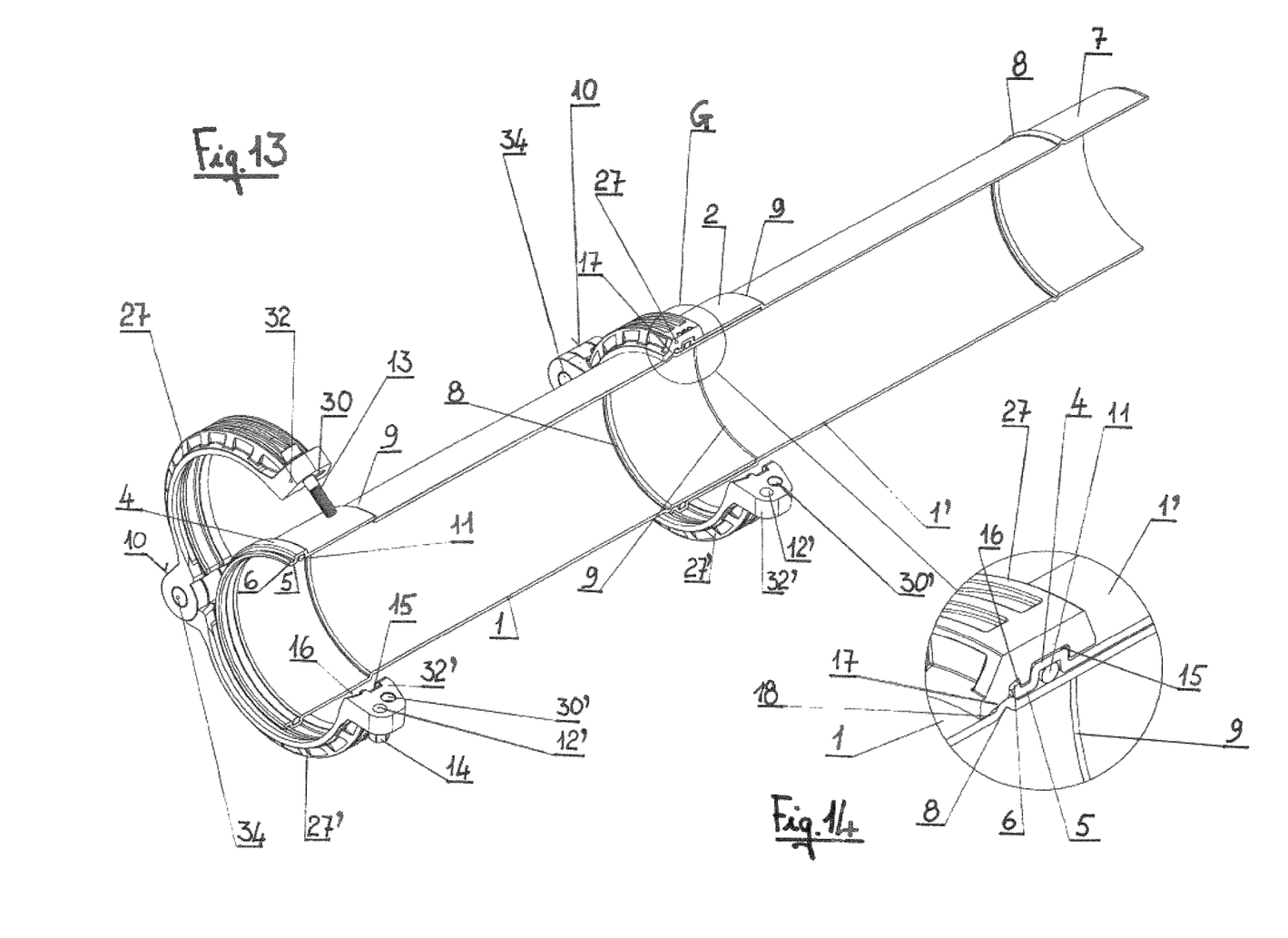
FIG. 13 illustrates a perspective longitudinal section of two tubular elements joined together by the joining system according to a third embodiment of this invention.
FIG. 14 illustrates the enlarged detail G of FIG. 13.

In a third embodiment of the invention (FIG. 13), the junction block 10 is composed of two locking semicircles 27, 27' joined together, on one side, by a connecting pin 34 while, on the other side, the ends are free and can be joined by means of a fixing screw 13 with relative nut 14. In this case, should one wish to use the spacer 28, it is therefore possible to use only one.

The assembly of a pipe consisting of two or more tubular elements takes place simply by inserting one tubular element inside the other: the male part 7 of a tubular element is introduced into the socket 2 (female part) of the opposite tubular element up to end of the axial stroke in order to guarantee the overcoming of the elastomeric gasket 11 present inside it. It is therefore possible to create a network of pipes in a short time and with the help of a few simple tools.

Figures 15, 16:
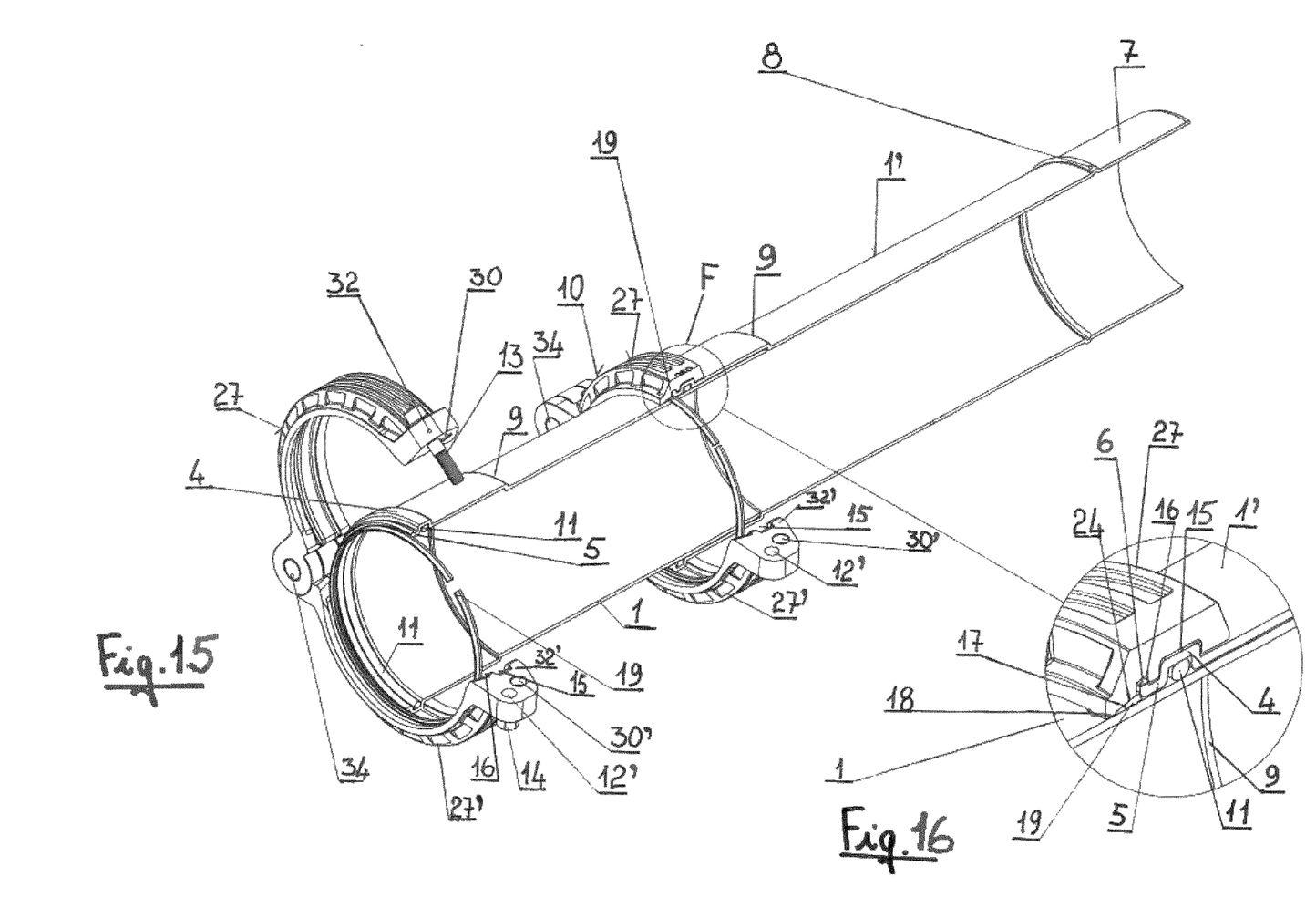
FIG. 15 illustrates a perspective longitudinal section of two tubular elements joined together by means of the joining system according to a fourth embodiment of this invention.
FIG. 16 illustrates the enlarged detail F of FIG. 15.
Figures 17, 18:
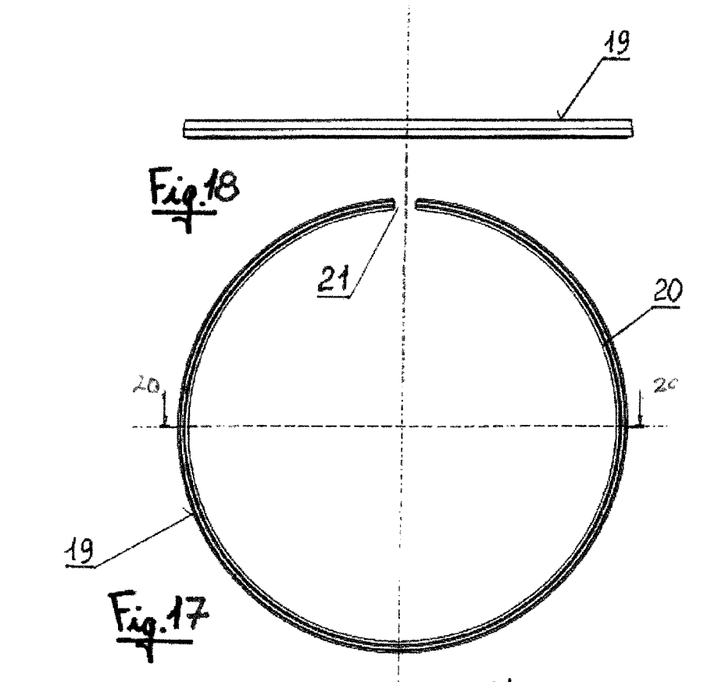
FIG. 17 illustrates the top view of a tightening ring according to the present invention.
FIG. 18 illustrates the side view of the tightening ring of FIG. 17.
Figures 19, 20:
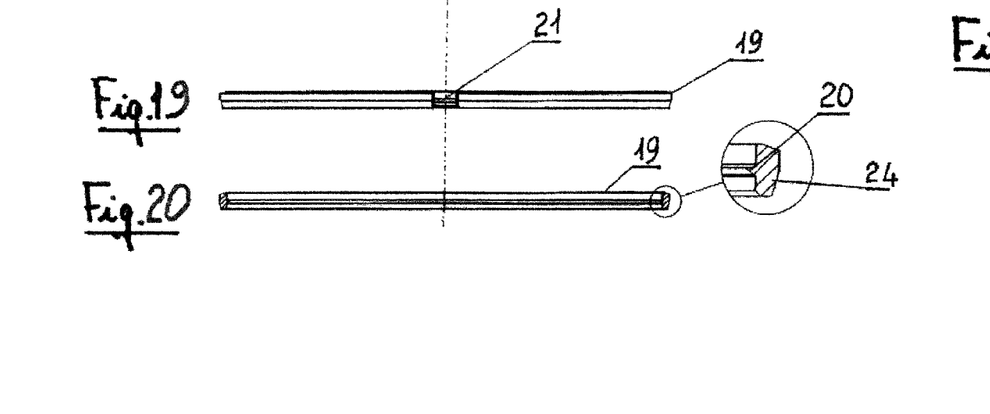
FIG. 19 illustrates a further side view of the tightening ring of FIG. 17.
FIG. 20 illustrates the cross section according to 20-20 of FIG. 17.
Figure 21:
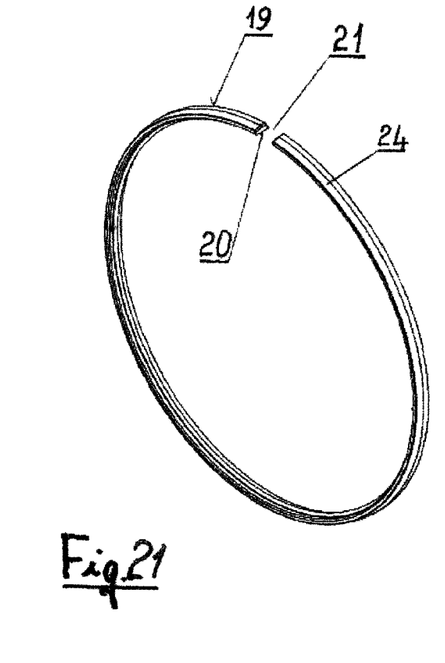
FIG. 21 illustrates a perspective view of the tightening ring of FIG. 17.

Also in this case, should it be necessary to have a shorter tubular element for conformation needs of the piping network, it is possible to cut the male end 7 of the tubular element 1 that is the one equipped with the radial protuberance 8. In the event that the cut included said protuberance 8, according to a fourth embodiment of the invention (FIG. 15), the retention of the cut tubular element takes place through the use of a truncated cone-shaped crimping ring 19 and with the methods already described in second embodiment.

The embodiments described in the present description and the configurations shown in the drawings are only the preferred embodiments of the present invention but the technical variants falling within the above expressed concept of the present invention are also to be considered protected by the patent.

What is claimed is:

1. Integrated joining system with tubular fluid distribution elements, the system comprising:
   tubular elements, each tubular element having a first enlarged cup shaped end and a second opposite end having a radial protuberance,
      wherein said first end includes:
         a flange having an outer concentric edge extending externally from the tubular element and concentric with said tubular element,
         a respective cavity facing an inside of said tubular element and adapted to receive and retain an elastomeric gasket therein, and
         the flange having a radial groove which is also concentric to said tubular element, placed adjacent to said concentric edge and an end edge protruding with respect to the external surface of the tubular element itself, and
   a junction block comprising two semicircles and clamping elements,
   wherein assembly of the tubular elements occurs by inserting the second opposite end of one tubular element inside the first cup shaped end of a second said tubular element until a free edge of the second opposite end contacts a shoulder of the first cup shaped end with the free edge of the second opposite end extending past the elastomeric gasket housed in the cavity, and the two semicircles of the junction block placed radially around the tubular element at said concentric edge and at said end edge which, by tightening thereof by the clamping elements, crimps the two tubular elements,
   wherein the two semicircles have, on an inner surface thereof, first and second radial cavities shaped to house therein the outer concentric edge of the flange in the first cavity and the end edge of said flange in the second cavity,
   wherein an edge of the junction block which is close to the second cavity has an inclined wall which rests on and covers the radial protuberance of the tubular element and includes a tooth which rests on an external surface of the tubular element whereby the two semicircles geometrically copy the profile of the flange of the second said tubular element, the radial protuberance and an adjacent part of the tubular element thus creating a solid crimping constraint when tightening screws of the junction block are turned.

2. Integrated joining system with tubular fluid distribution elements according to claim 1, wherein said outer concentric edge and said radial groove form an S-shaped flange.

3. Integrated joining system with tubular fluid distribution elements according to claim 1, wherein said radial protuberance of the tubular element is adapted to abut against the end edge of the second said tubular element.

4. Integrated joining system with tubular fluid distribution elements according to claim 1, wherein the two semicircles placed radially around the tubular element each include, at opposite ends thereof, a pair of symmetrical protrusions having through holes adapted to accommodate the tightening elements to prevent axial movement between the first and second tubular elements.

5. Integrated joining system with tubular fluid distribution elements according to claim 4, further comprising a spacer for aligning the two semicircles, the spacer adapted to accommodate the protrusions, and each spacer having a bushing adapted to fit into one said hole in a respective said protrusion, and each protrusion including another said hole to receive a respective tightening elements.

6. Integrated joining system with tubular fluid distribution elements according to claim 4, further comprising a junction pin for joining together one side of the two locking semicircles of the junction block, with opposite ends of the semicircles being free and adapted to be joined by the tightening elements.

7. Integrated joining system with tubular fluid distribution elements, the system comprising:
   tubular elements, each tubular element having a first enlarged cup shaped end and a second opposite end having a crimping ring,
      wherein said first end includes:
         a flange having an outer concentric edge extending externally from the tubular element and concentric with said tubular element,
         a respective cavity facing an inside of said tubular element and adapted to receive and retain an elastomeric gasket therein, and
         the flange having a radial groove which is also concentric to said tubular element, placed adjacent to said concentric edge and an end edge protruding with respect to the external surface of the tubular element itself, and
   a junction block comprising two semicircles and clamping elements,
   wherein assembly of the tubular elements occurs by inserting the second opposite end of one tubular element inside the first cup shaped end of a second said tubular element until a free edge of the second opposite end contacts a shoulder of the first cup shaped end with the free edge of the second opposite end extending past the elastomeric gasket housed in the cavity, and the two semicircles of the junction block placed radially around the tubular element at said concentric edge and at said end edge which, by tightening thereof by the clamping elements, crimps the two tubular elements,
   wherein the two semicircles have, on an inner surface thereof, first and second radial cavities shaped to house therein the outer concentric edge of the flange in the first cavity and the end edge of said flange in the second cavity,
   wherein an edge of the junction block which is close to the second cavity has an inclined wall which rests on and covers the crimping ring and includes a tooth which rests on an external surface of the tubular element whereby the two semicircles geometrically copy the profile of the flange of the second said tubular element, and locking of the first and second said tubular elements occurs through said crimping ring which has a conical trunk shape and has, on an inner part thereof, a tooth adapted to crimp to the first said tubular when fastening elements of the junction block are tightened.

8. Integrated joining system with tubular fluid distribution elements according to claim 7, wherein the conical trunk shaped crimping ring includes, on an inner part thereof, at least two teeth adapted to crimp to the tubular element when the fastening elements of the junction block are tightened.

9. Integrated joining system with tubular fluid distribution elements according to claim 7, wherein the conical trunk shaped crimping ring includes, on an internal part thereof, a series of at least teeth parallel to each other and interspersed with free spaces, adapted to crimp the tubular element when the fastening elements of the junction block are tightened.

10. Integrated joining system with tubular fluid distribution elements according to claim 7, wherein said crimping ring includes a notch of a size of which is determined on the basis of an effective need to tighten the tubular element according to the size of the circumference of the pipe and its thickness.

11. Integrated joining system with the tubular fluid distribution elements according to claim 7, wherein said crimping ring is adapted to slide along the tubular element until it touches an upper part of the flange of the second said tubular element so that an internal part of the junction block, at the inclined wall, meets an external part of the crimping ring.

12. Integrated joining system with tubular fluid distribution elements according to claim 11, wherein the inclined wall of the junction block, when the tightening element is tightened, presses on an inclined edge of the crimping ring, causing a firm crimping.

13. Integrated joining system with tubular fluid distribution elements according to claim 12, wherein the crimping ring includes, on the inner part thereof, teeth adapted to crimp to the tubular element and the teeth penetrate to an extent that varies from 0.5 to 1 or more millimeters into the tubular element.

* * * * *